United States Patent [19]
Morby et al.

[11] Patent Number: 5,126,918
[45] Date of Patent: Jun. 30, 1992

[54] ELECTRIC POWER DISTRIBUTION PANELBOARD-SWITCHBOARD ASSEMBLY

[75] Inventors: John A. Morby, Farmington; Robert J. Sabatella; Andre J. M'Sadoques, both of Southington; Robert G. Markowski, East Haven; Christine T. Lamberti, Canton, all of Conn.

[73] Assignee: General Electric Company, New York, N.Y.

[21] Appl. No.: 388,452

[22] Filed: Aug. 2, 1989

[51] Int. Cl.⁵ .............................. H02B 1/04
[52] U.S. Cl. .................. 361/358; 361/361; 361/379
[58] Field of Search ............. 361/341, 342, 353, 355, 361/356, 358, 361, 363, 376

[56] References Cited

U.S. PATENT DOCUMENTS

| | | | |
|---|---|---|---|
| 3,728,585 | 4/1973 | Olashaw | 361/379 |
| 4,142,225 | 2/1979 | Piersing et al. | 361/358 |
| 4,589,052 | 5/1986 | Dougherty | 361/94 |
| 4,675,481 | 6/1987 | Markowski et al. | 200/144 R |
| 4,728,914 | 3/1988 | Morris et al. | 335/6 |
| 4,744,003 | 5/1988 | Koslosky et al. | 361/363 |
| 4,752,233 | 6/1988 | Morby et al. | 439/212 |
| 4,754,247 | 6/1988 | Raymont et al. | 355/202 |
| 4,778,959 | 10/1988 | Sabatella et al. | 200/144 R |
| 4,778,961 | 10/1988 | M'Sadoques et al. | 200/144 R |
| 4,785,145 | 11/1988 | Owens et al. | 200/162 |

OTHER PUBLICATIONS

PCT WO85/04847, William "Enclosure for an Aircarft Inertial Reference Unit", Nov. 1985.
Ser. No. 281,614 entitled "Versatile Electric Disconnect Switch", filed Dec. 9, 1988, Markowski et al.

Primary Examiner—Gregory D. Thompson
Attorney, Agent, or Firm—Richard A. Menelly; Fred Jacob

[57] ABSTRACT

A combination panelboard-switchboard housing accepts plug-on connection with a plurality of modular electric switch-circuit breaker enclosures. The modular enclosure accepts circuit breakers or electric switches which can be field-installed with minor alteration to the enclosure. The modular switch enclosure further accepts a wide range of ampere ratings within a standard enclosure size. A mechanical latch arrangement on the bottom of the modular enclosure prevents the modular enclosure from being removed from the panel-board-switchboard housing. Controlled temperatures are achieved within the housing by optimized circulating air flow.

19 Claims, 4 Drawing Sheets

ELECTRIC POWER DISTRIBUTION PANELBOARD-SWITCHBOARD ASSEMBLY

BACKGROUND OF THE INVENTION

Electric power distribution panelboards and switchboards are currently available which accept circuit breakers and electric switches by means of a plug-on connection to the bus bars arranged therein. U.S. Pat. No. 4,744,003 describes one such panelboard arrangement. When electric switches or circuit breakers are to be installed on-site within such an operating panelboard, the electric power to the panelboard must be temporarily discontinued and the panelboard disassembled before such electric switch or circuit breaker can be installed. Where modification must be made to the panelboard interior in order to accept the electric switch or circuit breaker, some time is required before the power can be turned ON. This disruption in electric power within an industrial environment could cause scheduling problems both with respect to the related equipment as well as to operating personnel. To provide adequate electrical isolation between the different phases of a multi-phase panelboard or switchboard assembly, the bus conductors that transfer operating power from the electrical distribution circuits to the various switches connected with the panelboards and switchboards, large bus conductors are supported within the panelboard and switchboard interiors and heavy plates of insulative material are used to both support and electrically isolate the bus conductors. When the panelboards and switchboards are operated at near capacity levels, the heavy insulative plates thermally insulate the bus conductors and interfere with the convection air flow. Since the panelboard and switchboard enclosures are required to be closed in accordance with electrical industries standards, the temperature within the enclosures can rise substantially above ambient resulting in eventual damage to the panelboard components.

In accordance with the state-of-the-art panelboard and switchboard enclosures, a wide variety of electric switch designs are inventoried in order to meet the ampere requirements of varied electrical distribution circuits. The increased ampere-rated electric switches require larger components in order to accommodate the higher ampacity and to prevent the electric switches from overheating during long term steady state operating conditions.

It would be economically advantageous, to provide a single electric switch design that can operate over a wide range of ampere ratings and thereby eliminate the large inventory requirement of several electric switches of various component sizes. It would be further advantageous, to control the thermal environment within the panelboard and switchboard enclosure to safely and economically operate the switches at reduced operating temperatures.

U.S. Pat. No. 4,752,233, which Patent is incorporated herein for reference purposes, describes an adapter module for interfacing between an electric switch or circuit breaker and a panelboard or switchboard housing. The adapter module contains two compartments which allow two such circuit breakers, electric switches or a combination thereof to be plugged onto the panelboard or switchboard bus bars at one time. The adapter module also allows one electric switch or circuit breaker to be connected within one compartment while reserving the other compartment for add-on capability after the adapter is installed within the panelboard-switchboard enclosure.

U.S. Pat. Nos. 4,675,481; 4,785,145; 4,778,959; 4,778,961 each describe various electric switch configurations that can be received within the adapter module during factory or on-site installation. Since the components of each of the above described electric switches can be automatically assembled to reduce assembly costs, it would be further economically advantageous to assemble such switches in a panelboard or switchboard enclosure without incurring additional labor and component costs.

Further, when an electric switch or circuit breaker is required to be added to existing panelboard and switchboard enclosures, it would be economically advantageous to obtain such electric switch or circuit breaker in the form of a kit that can be quickly assembled within the panelboard and switchboard enclosure without having to completely disassemble the associated panelboard and switchboard housing.

One purpose of this invention accordingly is to provide a panelboard-switchboard housing that easily and quickly accepts multiple electric switch-circuit breaker enclosures without requiring long-time equipment shutdown. A further purpose of this invention is to provide an electric switch or circuit breaker modular enclosure that allow additional electric switches and circuit breakers to be field-installed at a minimum expense of time and labor.

An additional purpose of this invention is to provide a panelboard-switchboard housing that is designed to control the temperature rise of the bus conductors, electric switches and circuit breakers mounted within the housing.

SUMMARY OF THE INVENTION

The invention comprises a thermally and electromagnetically controlled combined panelboard-switchboard housing having a plurality of edge-mounted power bus conductors vertically arranged within the housing. The housing accepts a plurality of electric switch-circuit breaker modular enclosures that plug onto or bolt onto the panelboard-switchboard power bus conductors whereby electrical ground connection is achieved prior to contact between the modular enclosure conductor clips and the panelboard-switchboard bus conductors. Means are arranged on the opposite ends of the modular enclosure for attaching the modular enclosure to the housing in a manner such that a tool is required for later removal. Thermal control means are formed within the housing to optimize the circulating air flow.

DESCRIPTION OF THE PREFERRED EMBODIMENT

Before describing the Preferred Embodiment, it is helpful to review the description of an "electric switchboard" and an "electric panelboard". For purposes of this disclosure, a switchboard is defined as "a self-standing array of circuit interruption devices rated up to a particular ampere value". A panelboard is defined as "a wall mounted device that includes an array of circuit interruption devices up to a rating less than that of a switchboard". A switchboard can comprise a plurality of individual panelboards mounted within a common self-standing enclosure.

Figure 1:
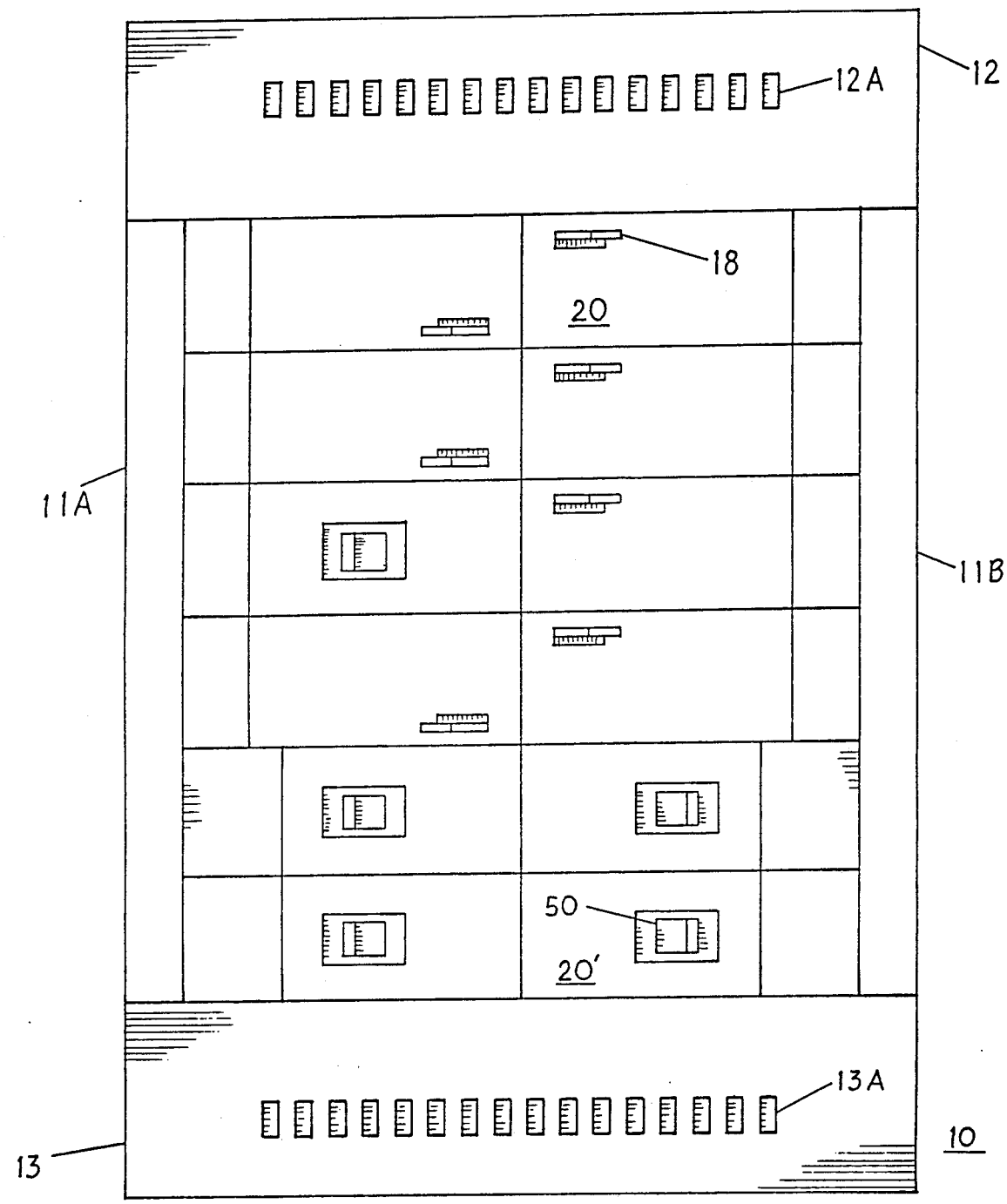
FIG. 1 is a front view of the panelboard-switchboard housing according to the invention.

The panelboard-switchboard housing 10 of FIG. 1 (hereafter "housing") covers a wide range of circuit interruption devices which are attached to the housing by means of an electric switch-circuit breaker enclosure module 20 (hereafter "module"). The module can contain a pair of electric switches as indicated by the electric switch operating handles 18 or a pair of circuit breakers, as indicated by the circuit breaker operating handles 50 shown within module 20 one example of an electric switch-circuit breaker module is described in U.S. Pat. No. 4,945,450. The modules can also contain an electric switch and circuit breaker within the same enclosure, if so desired. In accordance with the requirement that a "switchboard" be self-standing, the housing further comprises a top 12, and a bottom 13 joined by opposing sides 11A, 11B as indicated. The operation of the top and bottom thermal control air vents 12A, 13A will be described below in greater detail.

Figure 2:
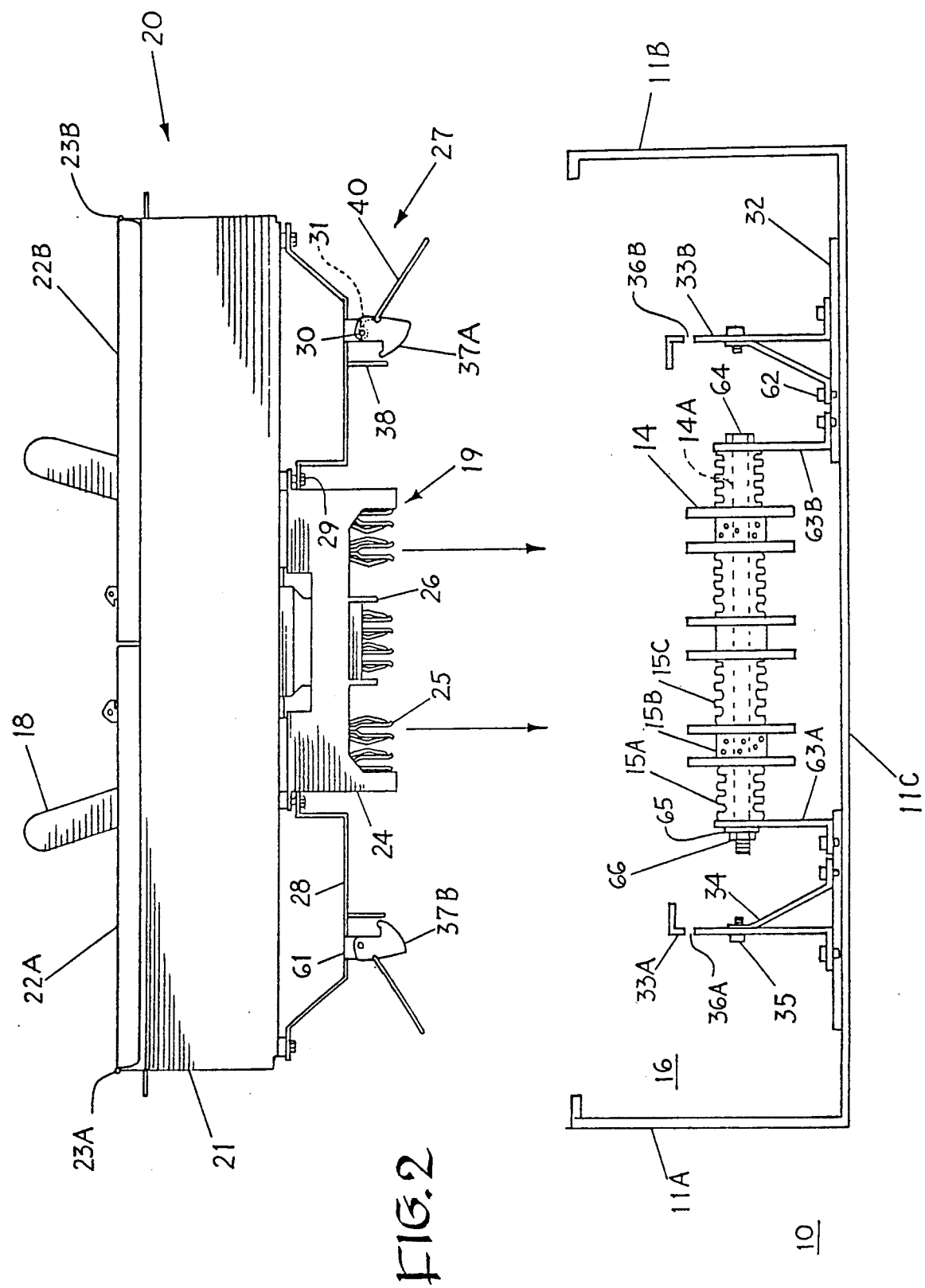
FIG. 2 is an end view of the top of the panelboard-switchboard housing of FIG. 1 with the electric switch-circuit breaker modular enclosure according to the invention in projection.

The attachment of the module 20 is best seen by referring now to FIG. 2 wherein the module is seen as consisting of a case 21 which is closed at the top by means of a pair of covers 22A, 22B each supported by corresponding hinges 23A, 23B arranged at the opposite ends of the case. An operating handle 18 is shown extending through each of the covers. Electrical connection between the electric switches contained within the module is made by means of an adapter module 19 that is attached to the bottom of the case by means of a pair of support brackets 28 and screws 29. The adapter module is described within the aforementioned U.S. Pat. No. 4,752,233 and should be reviewed for its description of the electrical interconnection between the enclosed electric switch or circuit breaker and the corresponding connector clips 25 which extend through an insulating-support 24. The individual connector clips are electrically isolated by baffles 26 integrally-formed with the insulative support 24. The combined latch-alignment assembly 27 (hereafter "assembly") comprises a pair of hook-shaped plates 37A, 37B that are pivotally attached to tabs 61 extending from the support bracket 28. Each hook-shaped plate is spring-loaded toward a planar hook guide 38 by means of a torsion spring 31 arranged about the hook pivot pin 30. When the module is attached to the housing, the hooks engage corresponding slots 36A, 36B formed within a top part of the Z-shaped rails 33A, 33B attached to the interior 16 to secure the module to the enclosure. To facilitate release of the hooks from the Z-shaped rails, a pair of handles 40 are attached to the hooks. The housing interior (hereafter "interior") basically comprises a pair of support frames 32 which are attached to the back 11C of the housing 10. The Z-shaped rails 33A, 33B are attached to the support frames 32 by means of screws 62 and are braced by brackets 34 and screws 35 as indicated. A pair of opposing L-shaped supports 63A, 63B support the edge-mounted bus bars 14 by means of an elongated insulated bolt 64 that passes through corresponding apertures formed in the bus bars, as indicated at 14A, and through tubular spacers 15A-15C. The insulated bolt is fastened to the L-shaped supports by means of a washer 65, and nut 66. The tubular spacers are of predetermined differing lengths to provide spacing between the support clamps and the bus bars; between the bus bars within the same phase; and between the bus bars in one phase and the bus bars of a separate phase. The larger-sized spacers 15A, 15C are grooved to increase the over-surface electrical clearance for high voltage applications. The spacers 15B between bus bars within the same phase can be metallic to improve the thermal transfer of heat away from the bus bars. Alternatively, the diameter of the insulators can be reduced or perforated as spacers 15B for maximum air transport facility. To further improve the thermal control of the interior, all the molded components such as the spacers 15A-15C are fabricated from a white colored material to promote heat reflectivity and enhance the thermal control of the interior. Additionally, the inner surfaces of the side 11A, 11B, bottom 11C, L-shaped supports 63A, 63B, brackets 34, support frames 32 and Z-shaped rails 33A, 33B can be coated with a heat reflective material. Optionally the metal components can be zinc, tin or cadmium plated to increase the heat reflectivity of these components. It is noted that when the module 20 is first connected with the interior, the hook guides 38 on the support brackets 28, contact the Z-shaped rails 33A, 33B in the interior before the connector clips 25 engage the corresponding bus bars 14. An operator holding the module by means of the handles 40, is thereby assured of contact between the assembly and the systems ground through the Z-shaped rails before the connector clips engage and connect with the energized bus bars. This ground connection between the assembly and the Z-shaped rails both during connection and disconnection of the module is an important safety feature in the event that the module is disconnected in an emergency situation without first disconnecting the electric power to the bus bars. Further, the hook guides 38 assist in aligning the connector clips 25 with the bus bars 14 when installing the module 20.

Figure 3:
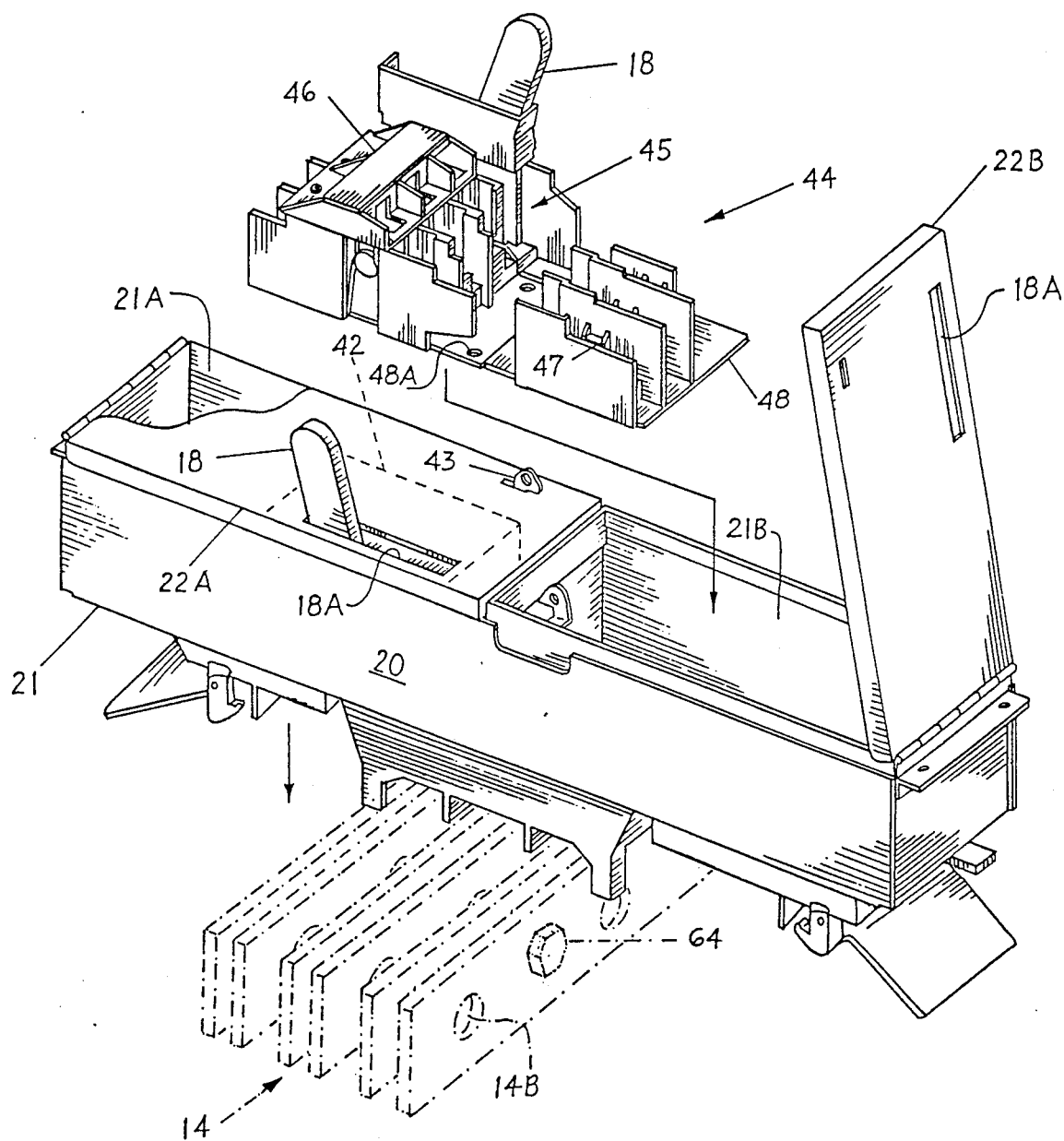
FIG. 3 is a top perspective view of the enclosure of FIG. 2 with an electric switch in isometric projection.

The excellent thermal control of the housing is best seen by referring now to both FIGS. 1 and 2 wherein the plurality of air vents 12A, 13A are depicted within the top and bottom of the housing to promote rapid heat transfer out from the housing by means of the so-called "chimney effect". The transfer of circulating air from the bottom air vents to the top air vents is optimized by the spacers 15A-15C and by the thermally reflective materials and coatings described earlier. The spacing between the bus bars, as determined by the spacers 15A-15C, provides a clear air transport path for the cooling air and substantially decreases the electromagnetic forces exerted on the adjacent bus bars such that additional mechanical bracing is no longer required. To allow for bolt-on connection with the modules on one side and with feed straps on an opposite side, an additional plurality of apertures 14B are arranged through each bus bar 14 as indicated in phantom in FIG. 3. The apertures promote the transfer of cooling air through the interior and optimize the cooling effects when not used for bolt-on connection. The thermal control of the housing has produced temperature differentials between the top and bottom of the housing in excess of ten degrees Celsius under full load-steady state operating conditions. The aforementioned use of a singular-sized switch to cover a wide range of ampere ratings without overheating is believed made possible by the excellent thermal transport properties of the housing.

It is noted that a pair of bus bars are used within each phase of the multi-phase electric power distribution system described herein. For lower ampere ratings, a single bus bar per phase can be employed in view of the excellent thermal transfer properties of the enclosure. The size of the bus bars for some ampere ratings can be reduced since the thermal conditions within the enclosure are advantageously controlled by the spacings between the bus bars and the heat reflective coatings.

In some instances, electric switches and circuit breakers are added to panelboards and switchboards that are already installed in electrical distribution circuits. A simplified arrangement for the addition of an electric switch 42 or circuit breaker 49 to the module 20 can be seen by now referring to FIGS. 3 and 4. In these representations, the module 20 was previously installed in a housing with an electric switch arranged within one compartment 21A as indicated at 42 under cover 22A in FIG. 3 and with the other compartment 21B empty. The switch operating handle 18 extends external to the module 20 through the handle access slot 18A. The spring-loaded hasp 43 prevents access to the electric switch when used with a padlock. To add an additional electric switch to the empty compartment 21B, a switch assembly 44 is field-installed by first removing the module from the associated housing and attaching the support plate 48 on the bottom of the switch assembly to the bottom interior of the module by means of thru-holes 48A formed within the support plate. The switch assembly is similar to that described within U.S. Pat. No. 4,902,864 titled "Versatile Electric Disconnect Switch". This Application is incorporated herein for reference purposes and should be reviewed for its disclosure of the switch operating mechanism 45 which is singularly employed over a large range of ampere ratings as well as the capability of the switch operating handle 18 to be positioned on either side of the module. The arc chute cover 46 environmentally protects the operating mechanism components while serving to extinguish the arcs that occur when the switch is turned OFF within an energized electrical distribution circuit. The fuse holders 47 allow the switch to be connected as a fusible switch if so desired. When the switch assembly is attached within the module compartment 21B, the operating handle 18 projects through the handle slot 18A formed within the cover 22B.

Figure 4:
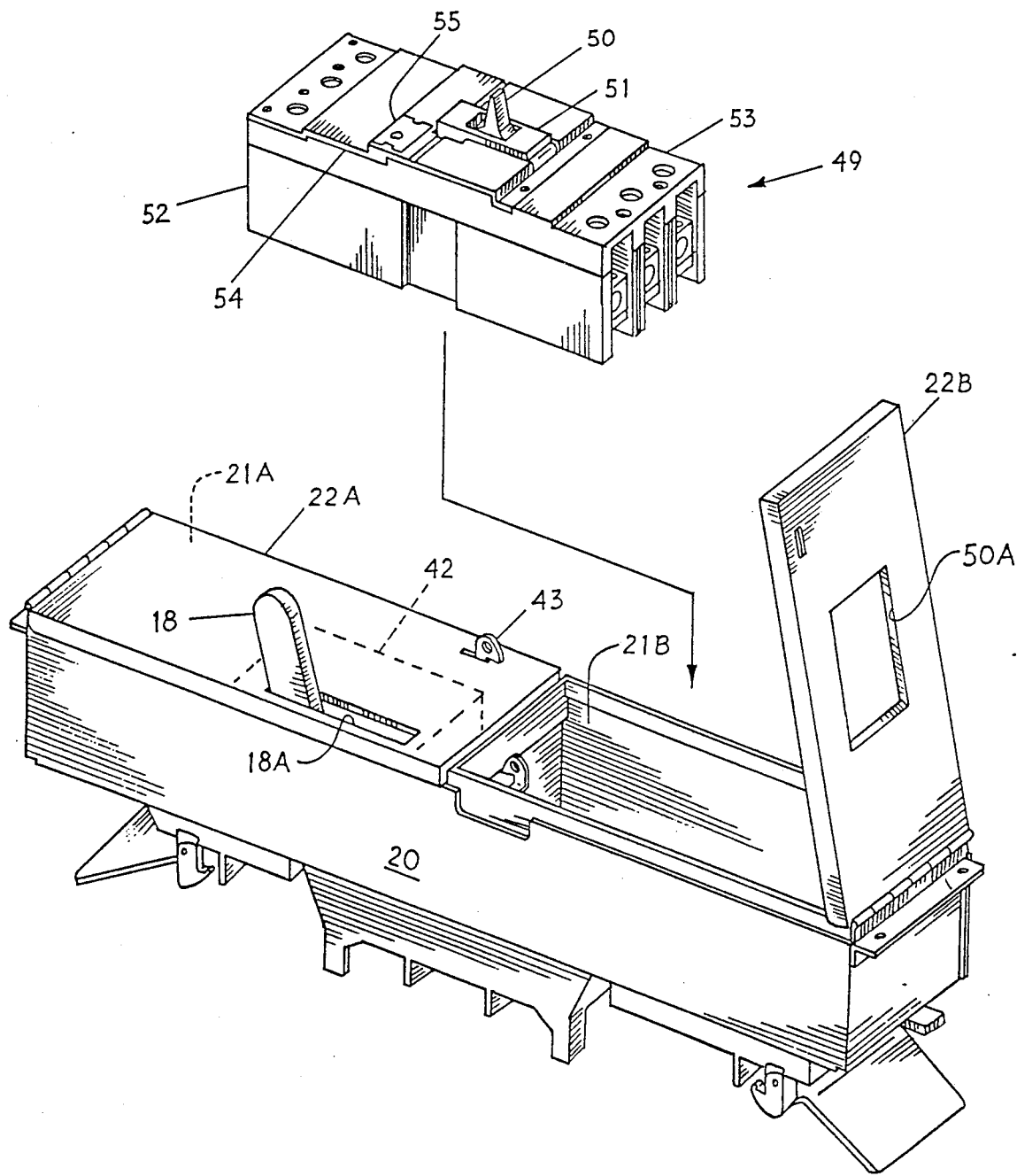
FIG. 4 is a top perspective view of the enclosure of FIG. 2 with a circuit breaker in isometric projection.

A similar module 20 is depicted in FIG. 4 with an electric switch 42 already installed and operably accessible by means of the switch operating handle 18 which extends through the same accessory slot 18A in the cover 22A. In this instance, a circuit breaker 49 is to be installed within the empty compartment 21B. The circuit breaker is of the type consisting of a molded plastic case 52, cover 53, rating plug 55 and accessory cover 54. The circuit breaker contains an electronic trip unit such as described in U.S. Pat. No. 4,589,052, the accessory cover is described within U.S. Pat. No. 4,754,247, and the rating plug is described in U.S. Pat. No. 4,728,914 all of which Patents are incorporated herein for reference purposes. When the circuit breaker is positioned within the compartment, the rating plug 55 which controls the ampere rating of the circuit breaker, and the accessory cover 54 which provides access to the circuit breaker accessories as well as the circuit breaker trip actuator, are both trapped behind the compartment cover 22B and hence are not accessible from the exterior of the module. This is an important feature of the invention since it prevents tampering with the rating plug, trip actuator and accessories once the circuit breaker is installed within the module. The circuit breaker handle 50 and escutcheon 51 extend through the opening 50A formed within the circuit breaker cover for ON-OFF operation only.

Having thus described our invention, what we claim as new and desire to secure by Letters Patent is:

1. A combined panelboard-switchboard enclosure comprising:
   a top and bottom section joined by a pair of opposing side sections thereby defining an open front section;
   a support frame extending along a rear of said front section;
   a pair of bus bar support rails intermediate said side sections attached to said support frame;
   a pair of module support rails attached to said support frame extending outward said bus bar support rails;
   a plurality of edge-mounted bus bars arranged intermediate to and parallel with said bus bar support rails, said bus bars being attached to said bus bar support rails by means of an elongated insulated bolt extending through said bus bars; and
   a plurality of first tubular spacers positioned on said insulated bolt intermediate said bus bars and bus bar support rails.

2. The enclosure of claim 1 including a pair of first and second brackets, each of said first and second brackets connecting a separate one of said pair of module support rails to said support frame.

3. The enclosure of claim 1 including a plurality of second tubular spacers positioned on said insulated bolt intermediate said bus bars arranged with one phase of a multi-phase electric power distribution circuit.

4. The enclosure of claim 3 including a third plurality of tubular spacers positioned on said insulated bolt intermediate said bus bars arranged within separate phases of said multi-phase electric power distribution circuit.

5. The enclosure of claim 1 wherein said module support rails are coated with a heat reflective material.

6. The enclosure of claim 2 wherein said bus bar support rails are coated with a heat reflective material.

7. The enclosure of claim 1 wherein said support frame is coated with a heat reflective material.

8. The enclosure of claim 3 wherein said first tubular spacers are ribbed to increase over-surface electric resistance and promote air transfer within said front section.

9. The enclosure of claim 4 wherein said second tubular spacers are ribbed to promote air transfer within said front section.

10. The enclosure of claim 5 wherein said third tubular spacers are ribbed to increase over-surface resistance and promote air transfer within said front section.

11. The enclosure of claim 1 wherein said top and bottom sections are apertured to promote heat transfer out of said front section.

12. The enclosure of claim 1 wherein said side sections are coated with a heat reflective material on an inner surface thereon.

13. The enclosure of claim 1 wherein said top and bottom sections are coated with a heat reflective material on an inner surface thereon.

14. The enclosure of claim 4 wherein said first and third tubular spacers are formed from a heat reflective material.

15. The enclosure of claim 3 wherein said second tubular spacers comprise metal.

16. The enclosure of claim 4 wherein said first and third tubular spacers are longer than said second tubular spacers.

17. The enclosure of claim 4 wherein said first, second and third tubular spacers provide predetermined controlled spacing between said bus bars.

18. The enclosure of claim 4 wherein said bus bars comprise a single bus bar for each phase of said multiphase electric power distribution circuit.

19. The enclosure of claim 18 wherein said bus bars comprise a pair of bus bars for each phase of said multiphase electric distribution circuit.

* * * * *